Patented Feb. 21, 1939

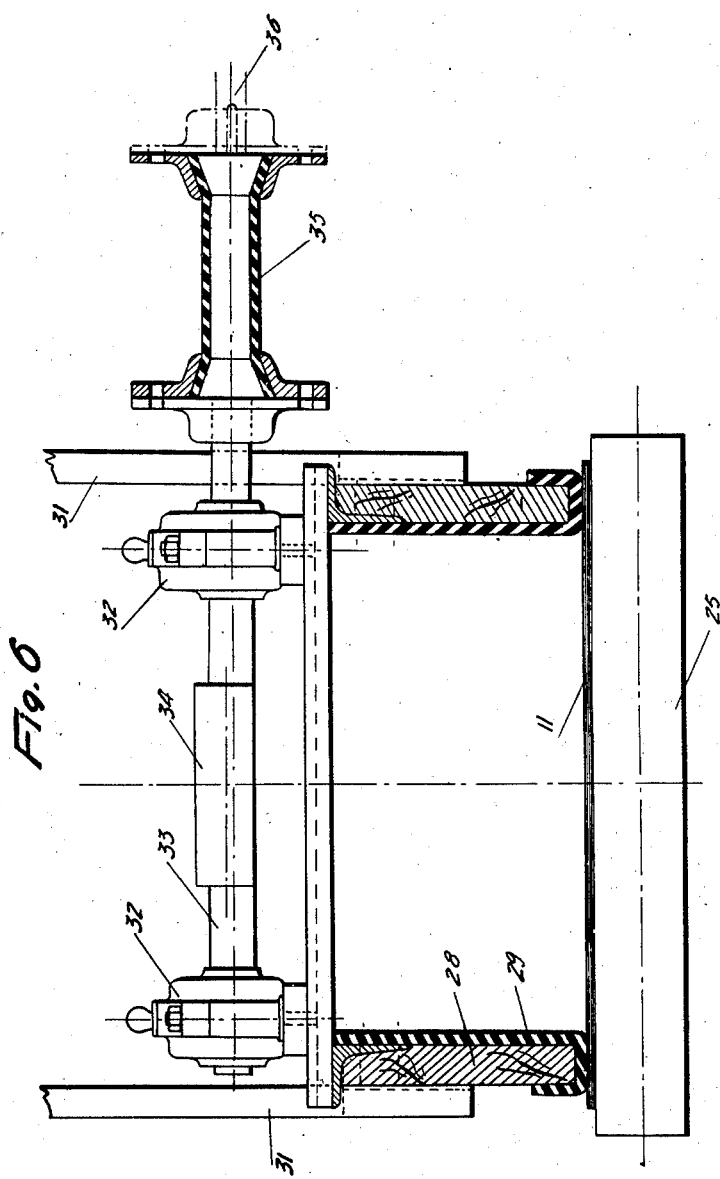

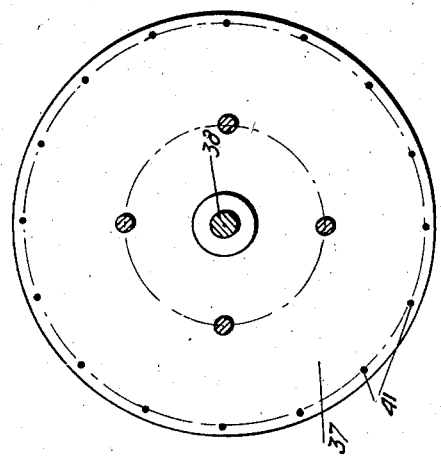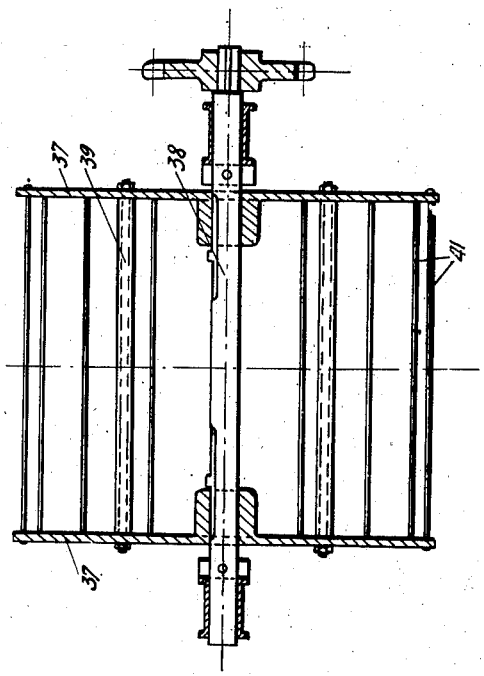

2,148,209

UNITED STATES PATENT OFFICE 2,148,209

METHOD FOR THE MANUFACTURE OF SUPERPHOSPHATES

Henri Loiseau and Georges Cartigny, Ertvelde-Rieme, Belgium, assignors to Compagnie Nationale de Matieres Colorantes et Manufactures de Produits Chimiques du Nord Reunies, Etablissements Kuhlmann, Paris, France, a corporation of France Application November 16, 1937, Serial No. 174,852
In Germany December 16, 1935

2 Claims. (Cl. 71—40)

Our invention has for its object a perfectly continuous method of manufacture of superphosphates from the feeding of the components (crushed phosphate and phosphoric or sulphuric acid) up to the storing of the final product.

Our method is chiefly characterized by the fact that the components are fed to a mixer in predetermined proportions and are transformed in said mixer into a sort of emulsion which falls in a continuous manner on to a conveyor comprising one or more belts on which the material becomes solid, is disintegrated, begins drying and is brought to its final dry state.

Our invention also covers the general arrangement used for executing the method, said arrangement including different interesting details to be disclosed hereinafter.

A form of execution of the arrangement chosen by way of example has been shown in accompanying drawings.

Figure 3:
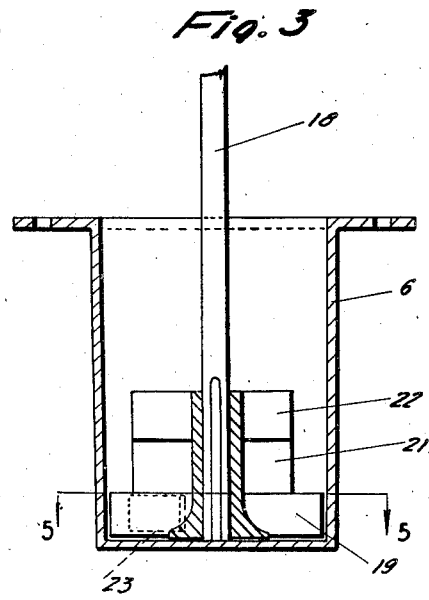
Figure 4:
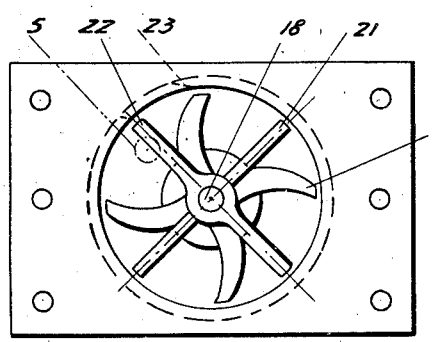
Figure 5:
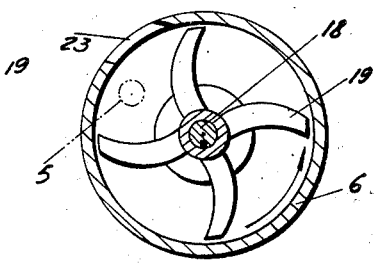

Figs. 3-4-5 relate to the mixer of which Fig. 3 is an axial cross-sectional vertical view, Fig. 4 a plan view and Fig. 5 a cross-section through line 5—5 of Fig. 3.

Fig. 6 is a side view, partly sectional of the vibratory control means of the edges of the conveyor belt.

Figs. 7 and 8 relate to the disintegrator of which Fig. 7 is an axial sectional view and Fig. 8 an end view.

The crushed phosphate is introduced into a hopper 1 opening over a distributing conveyor belt 2 followed by a known weighing device 3 ensuring a constant weight of delivery at each discharge. The phosphate thus measured falls into a funnel 4 extending into a telescopic tube 5. This tube 5 opens inside the mixer 6 in a manner to be disclosed hereinafter. Inside the mixer 6 opens also a tube 7 feeding the phosphoric or sulphuric acid from the container 8, the distribution of which is ensured by any known measuring device 9 such as a gauge of the so-called Howard type.

The weighing apparatus 3 and the measuring device 9 are connected through rigid control means with a common motor provided with speed reducing means whereby the predetermined proportion of the components is held constant.

In the case where the density of the acid were to vary, the device 3 would be adjusted correspondingly.

From the mixer 6 described hereinafter, the emulsion formed by the acid and the pulverulent phosphate, falls on an element 11 of a conveyor belt the tension of which is ensured by a movable pulley 12 on which a counterweight 13 exerts a tensioning action.

The emulsion becomes progressively solid on this belt the length of which is sufficient for the emulsion to be capable of disintegration when the product arrives on to the disintegrator 14 described hereinafter.

The disintegrated product falls then on to the elements 15, 16 of a conveyor belt where it begins being submitted to a drying in the open. It is discharged into the elevator 17 which leads it into the final drier not shown.

The mixer (Figs. 3 to 5) is constituted by a cylindrical receiver open at its upper part and along the axis of which is arranged a rotary shaft 18. This shaft carries at its end a stirring turbine or blade wheel 19 above which the cross-arms 21—22 are keyed to the same shaft 18.

The discharge of the product is performed through the slot 23 arranged along a generating line of the receiver 6. This slot is constantly open and therefore the arrival of phosphate and acid must be performed very soon after said slot 23 in the direction of rotation of the turbine 19 and of the arms 21, 22 in order to provide sufficient mixing before discharge of the product.

To this end for instance, the funnel which extends into the telescopic tube 5 leads to the opening drawn in dotted lines in Fig. 5, which opening lies a few centimeters above the arm 22. In principle the pipe 7 feeding the acid will open also above the arm 22, a little more towards the inside of the mixer and the jet is directed towards the central shaft 18 so as to prevent any accumulation of dirt thereon.

By reason of the phosphate feed drawing air along with it and of the high speed of the suitably shaped turbine, we obtain an emulsion of phosphate in the acid.

The element 11 of the conveyor belt is carried, from place to place, on rollers 25 which in the vicinity of the mixer 6 are much closer to each other so as to ensure perfect horizontality of the upper strand of the belt.

Other rollers 26, spaced much more apart, carry the lower strand. As they are in contact with the upper surface of the belt, they become dirty. For cleaning them, we use spring urged blades 27. The film removed by these blades falls on to the belt element 15 arranged immediately underneath.

In the vicinity of the stirrer or mixer 6 the emulsion is still very liquid and it is necessary to prevent the emulsion from falling off the belt; to this end we use flanges separate from the belt, which may be constituted for instance by wooden bars 28 with rubber linings 29 in fluidtight contact with the belt.

To prevent these flanges from becoming dirty and clogged, it is useful to give them a horizontal vibratory motion. To this end (Fig. 6) they are held by spring blades 31 and are mechanically integral with roller bearings 32 which provide a passage for a shaft 33 carrying an eccentric weight 34 and connected through an elastic coupling 35 with the shaft 36 of an electric motor. This motor rotates in a direction such that an imaginary roller keyed to its shaft would drive the belt in the desired direction of motion.

It should be noted that the vibratory motion being horizontal, the fluidtightness of the contact between the flanges and the belt is retained. As the vibrations are also directed in the direction of progress of the conveyor belt, they reduce the wear of the latter under the frictional action of the flanges.

Figure 1:
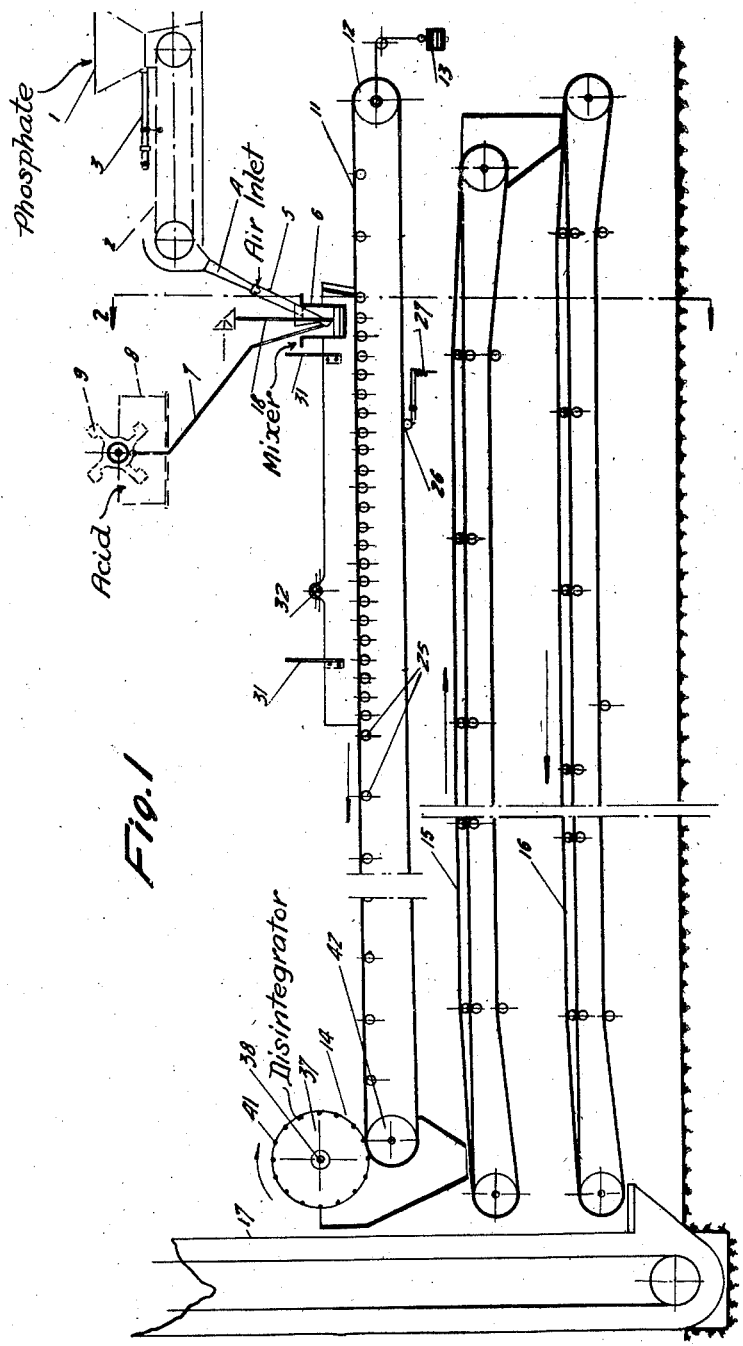
Fig. 1 is a diagrammatical side view of the whole arrangement.

The disintegrator 14 receiving the cake-forming solidified product is constituted (Figs. 1, 7 and 8) by two circular flanges 37 rigidly secured to the shaft 38 and interconnected by the stays 39. A series of thin steel wires 41 connect the peripheries of the two flanges together. Their tension is ensured by nuts arranged at their ends. The whole forms thus a squirrel cage arranged above the belt 5 so that the cylinder described by the outer generating line of the steel wires is tangent to a plane spaced by about 1 mm. with reference to and above the belt. Preferably the disintegrator is placed in the vicinity of the pulley 42 over which the belt changes its direction and the direction of rotation of the disintegrator is such that it furthers the fall of the disintegrating product on the belt element 15 arranged underneath belt 11. This provides an unground product appearing under the shape of small flakes.

The wires are not soiled or fouled to the least extent. This is due to the fact that in spite of their tension they are slightly sagged during operation and after same they return suddenly into their original position. The vibration thus produced loosens the particles which may have stuck to the wires.

The subdivided product, still very soft, must assume sufficient consistency or firmness for allowing its passage through the drier without agglomerating into lumps. This prior drying is provided on the lower belt elements 15—16.

Figure 2:
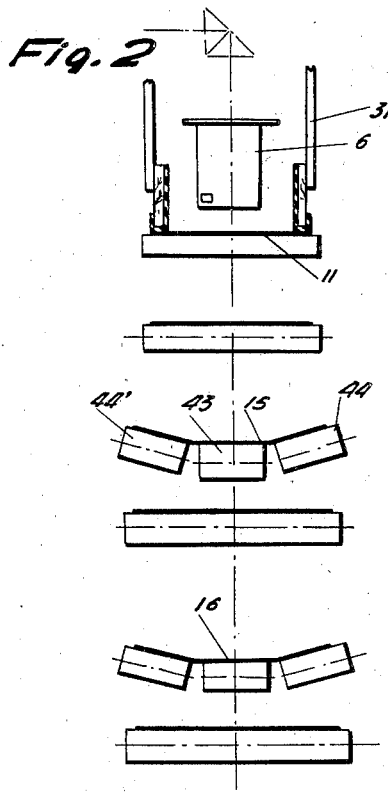
Fig. 2 is a diagrammatical cross-section at a larger scale, through line 2—2 of Fig. 1.

Preferably as shown in Fig. 2 the upper strand of these belt elements is slightly concave so as to avoid any fall of the product carried thereby. This concavity is obtained very simply, for instance by using as supporting rollers three-element rollers the central element of which or central roller 43 is alone horizontal, while the lateral elements 44, 44' are slopingly arranged.

However our invention is by no means limited to the conveyor means described. For instance at its outlet from the mixer, the emulsion or pulpy material may fall on a wide belt the cross-section of which is incurved so as to form a sort of a trough which opens and becomes progressively flat as the material becomes hard.

The final drying may be performed in the usual manner at the outlet from the elevator 17, for instance by means of a drier constituted by a horizontal cylindrical tube provided with blades which make the product advance.

What we claim is:

1. A method for the continuous preparation of superphosphates consisting in continuously feeding, under a common control, powdered raw phosphate rock and a mineral acid selected from the group consisting of sulphuric acid and phosphoric acid to a mixer in quantities which merely suffice to yield a thin layer upon a continuously moving surface when discharged thereupon, submitting the quantities of said powdered rock and of said acid to a quick centrifugal action in the presence of air whereby said air is drawn into the mixture and to form a light foam, continuously discharging said foam upon the moving surface in a thin layer, solidifying the reaction mixture and then disintegrating the same during the course of travel of said moving surface.

2. A method according to claim 1 in which the distintegration is effected by beater action without cutting.

HENRI LOISEAU.
GEORGES CARTIGNY.